United States Patent [19]

Nemoto

[11] Patent Number: 4,572,693
[45] Date of Patent: Feb. 25, 1986

[54] BALL-AND-SOCKET JOINT

[75] Inventor: Akira Nemoto, Toyohashi, Japan

[73] Assignee: Musashi Seimitsu Kogyo Kabushiki Kaisha, Toyohashi, Japan

[21] Appl. No.: 679,312

[22] Filed: Dec. 7, 1984

[30] Foreign Application Priority Data

Mar. 8, 1984 [JP] Japan .................................. 59-45086

[51] Int. Cl.$^4$ ............................................ F16C 11/06
[52] U.S. Cl. ...................................... 403/134; 403/50
[58] Field of Search .......................... 403/50, 51, 134; 411/517, 353, 530

[56] References Cited

U.S. PATENT DOCUMENTS 3,429,599  2/1969  Schmidt ................................ 403/51
3,791,748  2/1974  Goodrich, Jr. et al. ......... 403/131 X
4,174,008  11/1979  Preziosi et al. ..................... 411/353

Primary Examiner—Andrew V. Kundrat
Attorney, Agent, or Firm—c/o Ladas & Parry

[57] ABSTRACT

A ball-and-socket joint is protected in sealed state by a boot firmly secured at its outer end to the ball stud of the ball and at its inner end to the joint assembly by a clamping ring made of an elastic material in the form of a coil wound spirally with rectangular-section winding turns thereof lying adjacently side-by-side in the plane of the clamping ring. The spirally-coiled construction, in contrast to a helically-coiled construction, of the clamping ring permits it to be expanded greatly at the time of its fitting in the boot groove for assembly with little permanent deformation, whereby a great clamping force is obtainable.

4 Claims, 8 Drawing Figures

FIG. 1
FIG. 2A
FIG. 2B
FIG. 3
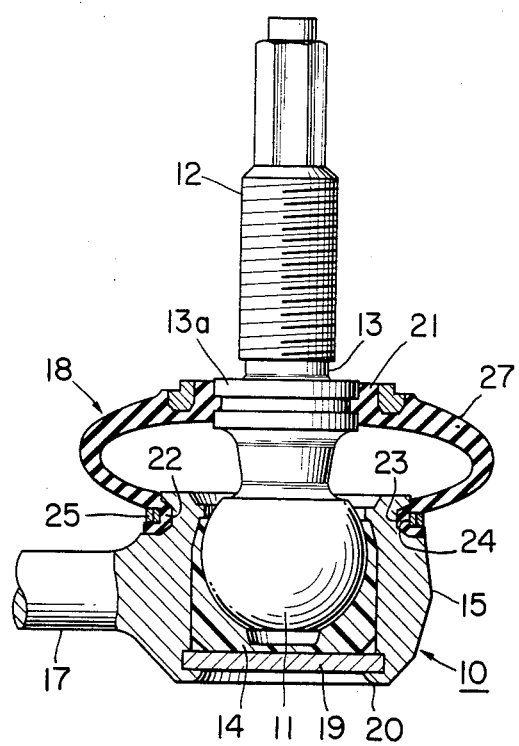
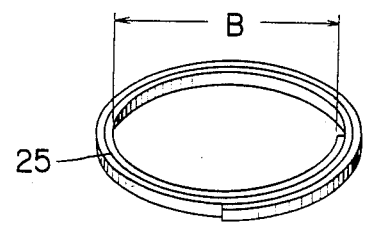
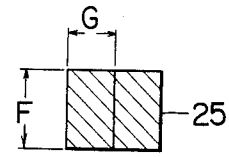
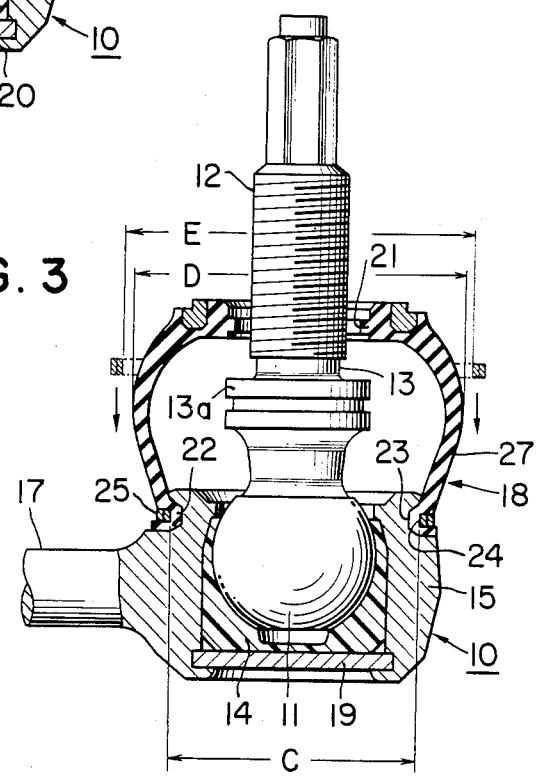

BALL-AND-SOCKET JOINT

BACKGROUND OF THE INVENTION

This invention relates to ball-and-socket joint (hereinafter referred to simply as ball joints) used in linkage mechanisms such as steering devices and suspensions of motor vehicles. More particularly, the invention relates to a ball joint having a clamping ring spirally coiled in a single plane for tightly clamping the inner skirt of a boot against a part such as the ball joint main structure thereby to secure the skirt of the boot to the main structure.

In a ball joint known heretofore, a clamping ring of helically-coiled form is used to similarly clamp a skirt of a boot to the main structure of the ball joint, as disclosed in U.S. Pat. No. 3,429,599 to A. Schmidt. A clamping ring of this known form is accompanied by the problem of deficient clamping force after it has been expanded for the purpose of fitting in a boot groove at the time of assembly of the boot. This drawback is attributable to permanent deformation in the clamping ring due to its being thus expanded as will be described in detail hereinafter.

SUMMARY OF THE INVENTION

It is an object of this invention to provide a ball joint in which the above described problem is overcome by reducing permanent deformation of the clamping due to expansion thereof for fitting in the boot groove thereby to obtain ample clamping force even when the clamping ring has been greatly expanded and thereby to obtain a high sealing effectiveness of the boot encompassing the ball joint assembly.

Another object of this invention is to provide a ball joint in which, in the design of the boot for ball joints of various forms and constructions, the shape of the outward bulge of the boot trunk part can be freely selected to produce durability of the boot such as its fatigue strength by causing the clamping ring to produce ample clamping force even after being greatly expanded, as described above.

According to this invention, briefly summarized, there is provided a ball-and-socket joint protected in sealed state by a boot firmly secured at its outer end to a ball stud of the ball and at its inner end to the joint assembly by a clamping ring made of an elastic material and characterized by its spirally-coiled construction with coil winding turns thereof lying contiguously side-by-side in the plane of the clamping ring.

The following detailed description of this invention with respect to a specific embodiment thereof will indicate more clearly the nature and utility of the invention when read in conjunction with the accompanying drawings briefly described below.

BRIEF DESCRIPTION OF THE DRAWINGS

In the drawings:

FIG. 1 is side view, with parts cut away and parts shown in longitudinal section, of one example of a ball joint according to this invention in assembled state;

FIG. 2A is a perspective view showing one example of a boot clamping ring of spirally-coiled form used in the ball joint to of the invention;

FIG. 2B is an enlarged cross section of the clamping ring shown in FIG. 2A;

FIG. 3 is a side view similar to FIG. 1, which shows a boot secured at its inner end to the ball joint assembly but not yet secured at its outer end, thereby being in a free state, and which indicates certain diameters to the clamping ring;

DESCRIPTION OF THE PREFERRED EMBODIMENTS

Figure 4:
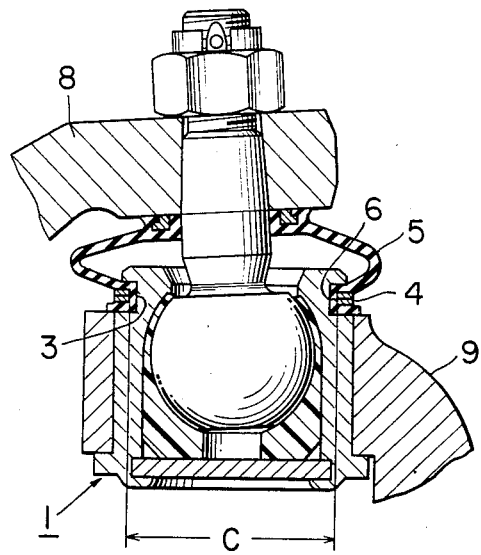
FIG. 4 a side view similar to FIG. 1 of an example of a ball joint known in the prior art in assembled state.

In one example, as shown in FIG. 1 through FIG. 3, of the ball joint according to this invention, the ball joint assembly 10 comprises, essentially: a ball 11 of mostly spherical shape; a ball stud 12 having a shank 13 integrally formed with the ball 11 at its end; a bearing member 14 rotatably encompassing and holding the ball 11; a socket part 15 fixedly encompassing and holding the bearing member 14 and integrally formed at one end of a connecting shaft 17; and a boot 18 encompassing the shank 13 and having outer and inner or upper and lower (as viewed in FIGS. 1 and 3) open ends respectively secured to the shank 13 and the upper part of the socket part 15.

The socket part 15 has upper and lower (as viewed in FIGS. 1 and 3) openings. After the ball 11 has been positioned within the socket part 15 from above, and the bearing member 14 has been inserted thereinto through the lower opening from below to clasp the ball 11, the lower opening of the socket part 15 is closed by a closing and retaining plate 19, which is fixed in place by peening at 20. Then the boot 18, which is made of an elastic material such as a synthetic rubber, is fitted in place and secured to the shank 13 of the ball stud 12 and the upper part of the socket part 15 as described below thereby to shut off the space above the ball 11 and the bearing member 14 and around the adjacent part of the shank 13 from the outside.

The boot 18 is fitted at its upper opening ring 21 into an annular groove formed around the outer periphery of a flange 13a of the shank 13 and at its lower opening rim 22 into a peripheral groove 23 formed around the upper part of the socket part 15.

Around the outer periphery of the lower opening rim 22 or skirt of the boot 18, an annular boot groove 24 with its opening part facing radially outward is formed. A clamping ring 25 is fitted in this boot groove 24 to secure the lower opening rim 22 of the boot 18 in the peripheral groove 23 in the socket part 15. This clamping ring 25 is a spirally-coiled structure made of a metal or some other suitable material and is formed with approximately 2¼ winding turns in its free state as shown in FIG. 2A. A unique and important feature of this clamping ring 25 is its spirally wound construction with a rectangular cross section as shown in FIG. 2B. This cross section is shown to comprise two winding turns of the coil spring material, each of substantially rectangular cross-sectional shape, disposed adjacently in side-by-side mutually contacting relation in the plane of the ring 25. The dimension F of each rectangular winding turn in the axial direction of the ring is a number of times the dimension G in the radial direction. This structural characteristic of this clamping ring 25 is highly advantageous as will be described hereinafter.

The boot 18 is formed to have, in its free state, a substantially cylindrical barrel shape with an outwardly bulging middle trunk 27 of relatively thin wall thickness between its opposite opening rims 21 and 22 as shown in FIG. 3. As a consequence, the difference between the maximum outer diameter D of the boot 18 and the diameter C of the boot groove 24 is relatively great.

For this reason, when the clamping ring 25 is to be fitted into its clamping position, it is expanded radially outward so that its inner diameter, which in its free state is B as designated in FIG. 2A becomes E as indicated in FIG. 3, which inner diameter E is slightly greater than the above mentioned maximum outer diameter D of the boot 18 in its free state. The clamping ring 25 thus expanded can then be slipped downward over and past the trunk 27 of the boot 18 from above and fitted into the boot groove 24, then being released from the previous expanding force thereby to assume its elastically clamping function.

In this case, the degree of expansion of the inner diameter of the clamping ring 25 becomes as much as approximately 48.8 percent. As will be apparent from the results of experiments set forth hereinafter, the clamping ring 25 of the ball joint of this invention has a low rate of permanent deformation and, moreover, exhibits a high value of clamping force upon being fitted in the boot groove 24. As a result, an amply effective sealing function can be attained. More specifically, in spite of the relatively great difference between the boot groove diameter C and the maximum diameter of the boot 18 in its free state as mentioned hereinabove, when the clamping ring 25 is fitted in the boot groove 24, it exerts a great clamping force on the lower opening rim 22 of the boot 18 to tightly press this rim 22 into and against the peripheral groove 23 around the upper part of the socket part 15.

It is to be understood that the ball-and-socket joint to be used is not limited to the above described specific example thereof. For example, the ball joint assembly can be of fiber-reinforced plastic construction, and socket part 15 and the bearing member 14 may be made of the same material and formed as a single integral structure. Another modification is the use of a socket part 15 without a lower opening so as to do away with a closing plate 19. In still another modification, a flange part is formed integrally with and around the outer peripheral bottom part of the bearing member 14 and is fitted in a groove provided around the inner wall surface of the socket part 15. Furthermore, the number of winding turns of the spirally coiled clamping ring 25 may be increased or decreased depending on the necessity.

For a full understanding of the advantage of this invention, the general nature and limitations of a conventional ball-and-socket joint, as disclosed in U.S. Pat. No. 3,429,599 to A. Schmidt, will be briefly described with respect to a typical example thereof and with reference to FIGS. 4, 5A, 5B, and FIG. 6 and compared with ball joint of this invention.

Figure 5A:
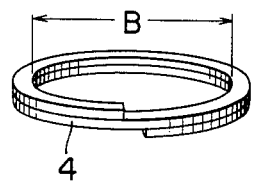
FIGS. 5A and 5B are respectively a perspective view and an enlarged cross section of the clamping ring used in the ball joint shown in FIG. 4.
Figure 5B:
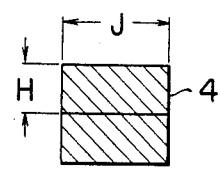

In the conventional ball joint, as shown in FIGS. 4, 5A and 5B, the lower skirt of the boot 5 is secured to the upper part of the ball joint assembly 1 by a metal clamping ring 4 in the form of a helically would coil which is once expanded and then fitted in the boot groove 6, similarly as in the case of the ball joint of this invention. It will be seen in FIG. 5B that, in contrast to the spirally-wound clamping ring 25 of this invention, the clamping ring 4 is of helically-coiled construction, in which rectangular winding turns of the coil material are disposed in stacked state in the axial direction of the ring 4. Each winding turn has a dimension J in the radial direction of the ring which is a number of times greater than the dimension H in the axial direction of the ring.

Figure 6:
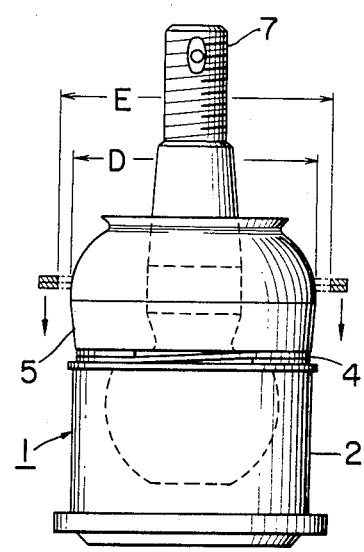
FIG. 6 is a side view of the known ball joint shown in FIG. 4 in partly assembled state with its boot in free state.

As shown in FIG. 6, this clamping ring 4 is fitted in the boot groove around the outer peripheral skirt of the boot 5 by being so expanded from its free-state inner diameter B to an expanded inner diameter E which is somewhat greater than the maximum outer diameter D of the boot 5 in its free state, being slipped downward from above past the maximum diameter part of the boot 5 and permitted to contract under its own elastic spring force into the boot groove of a diameter C, thereby to clamp the lower open skirt of the boot 5 against and around the upper part of the ball joint assembly.

When the difference between the above mentioned diameters D and C is relatively small, ample clamping force can be obtained from the clamping ring 4, and there is no problem. However, when a boot such as the boot 18 in FIG. 3 with a bulging trunk 27 in its free state must unavoidably be used, this difference between the diameters D and C becomes great, and the desired clamping force cannot be obtained from the clamping ring 4. That is, this deficiency in the case of a helically-coiled clamping ring 4 may be attributed to a great permanent deformation arising in this type of ring at the time it is expanded for assembly because of the relatively great section modulus of each winding turn due to its relatively great radial dimension J.

This deficiency and its possible cause has been confirmed by the results of certain experiments I have carried out as indicated in Table 1.

As indicated in Table 1, the clamping force of the known clamping ring 4 of helically-coiled form drops markedly with an increase of the degree of inner diameter expansion. For this reason, in the case where it is necessary to expand the clamping ring to a large inner diameter at the time of assembly, this clamping ring is virtually useless.

In contrast, the clamping ring according to this invention can be expanded to a much greater degree without entailing a great permanent deformation, whereby a relatively great clamping force of the clamping ring can be obtained after it has been fitted in the boot groove. This advantageous feature may be attributed to the relatively small value of the section modulus of each of the winding turns of the spirally-coiled clamping ring due to its relatively small radial dimension G (FIG. 2B).

TABLE 1

| Test article: | Known clamping ring | Clamping ring 25 of this invention |
|---|---|---|
| Cross section: | as in FIG. 5B | as in FIG. 2B |
| Dimensions, (mm): | J = 1.6 | G = 0.8 |
|  | H = 0.8 | F = 1.4 |
| Degree of inner dia. expansion | 21.4% | 48.8% |
| $\frac{E - B}{B} \times 100$ | 35.1% |  |
| Degree of permanent deformation | 3.28% | 1.35% |
| $\frac{\left(\begin{array}{c}\text{Free diam. after}\\ \text{expansion}\end{array}\right) - B}{B} \times 100$ | 4.53% |  |

TABLE 1-continued

| Test article: | Known clamping ring | Clamping ring 25 of this invention |
|---|---|---|
| Clamping force - | 5.14 kg | 5.80 kg |
| Force to expand to inner diam. C again after expansion: | 2.05 kg | |

What I claim is:

1. A ball-and-socket joint assembly comprising in combination:
   (a) socket means having bearing means for a ball therein, said socket means having an outwardly directed peripheral groove around a socket opening thereof;
   (b) a ball stud having a shank and a ball adapted to be rotatably received in said bearing means;
   (c) a boot made of an elastic material with opposite ends encompassing said shank, said boot having between said ends an outwardly bulging middle trunk which has a cross section in its free state greater than the general cross section of said socket means, one end of the boot being adapted to be secured to said shank and the other end of the boot being formed as a rim adapted to fit in said peripheral groove of the socket means;
   (d) a clamping ring made of an elastic material having the form of a coil wound spirally with the winding turns thereof lying adjacently side-by-side in the plane of the clamping ring each of said winding turns having substantially rectangular shape in cross section with a dimension in the axial direction of the clamping ring which is a plurality of times the dimension in the radial direction, said clamping ring being adapted to fit around said other end of the boot so as to clamp and hold firmly with elastic spring force said other end of the boot sealingly against said socket means;
   (e) and the size and dimensions of the assembly being such that said clamping ring cannot be slipped over the assembly into the position for clamping and holding said other end of the boot, said bulging middle trunk of the boot being greater in diameter than the inner diameter of said clamping ring in its free state;
   (f) and with said axial and radial dimensions and number of winding turns being chosen to reduce the degree of permanent deformation resulting from expansion over said trunk and to maintain a desired clamping force for a given greater trunk diameter.

2. A ball-and-socket joint assembly according to claim 1 in which said clamping ring has approximately $2\frac{1}{4}$ winding turns.

3. A ball-and-socket joint assembly according to claim 1 in which said socket means has a part extending outwardly therefrom in such a direction as to prevent slipping the clamping ring over said joint assembly into the position for clamping and holding said other end of the boot.

4. A ball-and-socket joint according to claim 3 in which said part is a connecting shaft integral with the socket means.

* * * * *